(12) United States Patent
Shaffer

(10) Patent No.: US 7,735,188 B2
(45) Date of Patent: Jun. 15, 2010

(54) AIR INLET COVER AND PORTABLE BLOWER/VACUUM INCORPORATING SAME

(75) Inventor: Chadwick A. Shaffer, Oakdale, MN (US)

(73) Assignee: The Toro Company, Bloomington, MN (US)

( * ) Notice: Subject to any disclaimer, the term of this patent is extended or adjusted under 35 U.S.C. 154(b) by 436 days.

(21) Appl. No.: 11/645,078

(22) Filed: Dec. 22, 2006

(65) Prior Publication Data

US 2008/0148513 A1 Jun. 26, 2008

(51) Int. Cl.
*A47L 5/00* (2006.01)
(52) U.S. Cl. .............................. 15/405; 15/344; 15/339
(58) Field of Classification Search .................. 15/344, 15/339, 405
See application file for complete search history.

(56) References Cited

U.S. PATENT DOCUMENTS

| | | |
|---|---|---|
| 2,024,367 A | 12/1935 | Eriksson-Jons |
| 3,209,988 A | 10/1965 | Fox et al. |
| 4,269,571 A | 5/1981 | Shikutani et al. |
| 4,288,886 A | 9/1981 | Siegler |
| 4,290,165 A | 9/1981 | Hiramatsu et al. |
| 4,325,163 A | 4/1982 | Mattson et al. |
| 4,413,371 A | 11/1983 | Tuggle et al. |
| 4,451,951 A | 6/1984 | Satoh |
| D279,319 S | 6/1985 | McCloskey et al. |
| 4,644,606 A | 2/1987 | Luerken et al. |
| 4,674,146 A | 6/1987 | Tuggle et al. |
| 4,694,528 A * | 9/1987 | Comer et al. .................. 15/330 |
| D299,074 S | 12/1988 | Tuggle et al. |
| D299,570 S | 1/1989 | Kiyooka et al. |
| D299,571 S | 1/1989 | Kiyooka et al. |
| 4,870,714 A | 10/1989 | Miner |
| D304,510 S | 11/1989 | Baker et al. |
| 4,884,314 A | 12/1989 | Miner et al. |
| D307,655 S | 5/1990 | Hinklin et al. |
| 4,928,347 A | 5/1990 | Krasznai et al. |
| D310,437 S | 9/1990 | Gierke et al. |
| 4,955,107 A | 9/1990 | Kawai |
| 5,003,662 A | 4/1991 | Everts |

(Continued)

FOREIGN PATENT DOCUMENTS

GB 324972 2/1930

(Continued)

OTHER PUBLICATIONS

U.S. Appl. No. 29/270,437, filed Dec. 22, 2006, Martin et al.

(Continued)

*Primary Examiner*—Joseph J Hail, III
*Assistant Examiner*—Shantese McDonald
(74) *Attorney, Agent, or Firm*—Mueting, Raasch & Gebhardt, P.A.

(57) ABSTRACT

A blower/vacuum having an air inlet cover and a blower tube, both of which attach to a blower housing for operation of the blower/vacuum in a blower mode. The air inlet cover may removably attach to both the blower housing and to the blower tube. In some embodiments, operation of the blower/vacuum may generally be restricted unless both the blower tube and the air inlet cover are first installed. The blower/vacuum may further be adapted to operate in a vacuum mode by removing the air inlet cover and blower tube and replacing the same with a vacuum tube assembly and a vacuum collection container, respectively.

21 Claims, 15 Drawing Sheets

U.S. PATENT DOCUMENTS

| | | | |
|---|---|---|---|
| 5,035,586 A | 7/1991 | Sadler et al. | |
| 5,222,275 A * | 6/1993 | Baker et al. | 15/329 |
| 5,245,726 A | 9/1993 | Rote et al. | |
| 5,256,032 A | 10/1993 | Dorsch | |
| D352,579 S | 11/1994 | Baker et al. | |
| D358,912 S | 5/1995 | Baker et al. | |
| 5,423,660 A | 6/1995 | Sortor | |
| D368,341 S | 3/1996 | Pink | |
| 5,511,281 A | 4/1996 | Webster | |
| 5,522,115 A | 6/1996 | Webster | |
| 5,535,479 A | 7/1996 | Pink et al. | |
| 5,560,078 A | 10/1996 | Toensing et al. | |
| D375,822 S | 11/1996 | Lessig, III et al. | |
| 5,588,178 A | 12/1996 | Liu | |
| 5,601,400 A | 2/1997 | Kondo et al. | |
| 5,604,954 A | 2/1997 | Webster et al. | |
| 5,638,574 A | 6/1997 | Haupt et al. | |
| 5,659,920 A | 8/1997 | Webster et al. | |
| 5,673,457 A | 10/1997 | Webster et al. | |
| D386,841 S | 11/1997 | DeMore et al. | |
| 5,689,852 A | 11/1997 | Svoboda et al. | |
| 5,692,262 A * | 12/1997 | Haupt et al. | 15/339 |
| 5,701,632 A | 12/1997 | Webster et al. | |
| 5,711,048 A | 1/1998 | Pink et al. | |
| 5,727,283 A | 3/1998 | Webster | |
| 5,768,743 A | 6/1998 | Webster | |
| 5,791,568 A | 8/1998 | Keim | |
| 5,794,864 A | 8/1998 | Hammett et al. | |
| D400,322 S | 10/1998 | Webster et al. | |
| D405,566 S | 2/1999 | Webster et al. | |
| D416,360 S | 11/1999 | Enkyo et al. | |
| 5,979,013 A | 11/1999 | Beckey et al. | |
| 6,003,199 A | 12/1999 | Shaffer | |
| RE36,627 E | 3/2000 | Pink et al. | |
| 6,059,541 A | 5/2000 | Beckey et al. | |
| D426,354 S | 6/2000 | Ohi et al. | |
| D431,697 S | 10/2000 | Hayakawa et al. | |
| 6,158,082 A | 12/2000 | Beckey et al. | |
| D445,972 S | 7/2001 | Doria | |
| 6,324,720 B1 | 12/2001 | Beckey et al. | |
| D461,604 S | 8/2002 | Martin et al. | |
| 6,442,790 B1 | 9/2002 | Svoboda et al. | |
| 6,622,341 B2 | 9/2003 | Jong | |
| 6,629,818 B2 * | 10/2003 | Svoboda | 415/121.1 |
| D498,885 S | 11/2004 | Robson | |
| 6,834,413 B2 | 12/2004 | Sanders et al. | |

OTHER PUBLICATIONS

U.S. Appl. No. 11/645,141, filed Dec. 22, 2006, Shaffer et al.
Sears, Roebuck and Co., "Operator's Manual Craftsman® 1.4 cu. in./24cc 2-Cycle Gasoline Powered Blower/Vac/Mulcher Model No. 358.797931," Hoffman Estates, IL; Aug. 12, 1996:14 Sheets.

* cited by examiner

AIR INLET COVER AND PORTABLE BLOWER/VACUUM INCORPORATING SAME

TECHNICAL FIELD

The present invention relates generally to hand-held, portable blower/vacuums and, more particularly, to air inlet covers, impellers, and motors for use with the same.

BACKGROUND

Convertible blower/vacuum units (also referred to herein as "blower/vacs") are commonly used by homeowners and professionals alike for the removal of debris from yards, driveways, sidewalks, etc. As used herein, a convertible blower/vac is a portable device which can be configured for use as either a debris blower or vacuum. When used as a vacuum, vacuum attachments coupled to a housing of the blower permit leaves or similar debris to be vacuumed into an attached bag or other debris container.

When used in the blower configuration, blower/vacs provide a sweeping action created by the production of a fast moving stream of air generated by a rotating impeller located within the blower housing. The impeller draws air into the housing through an air inlet and exhausts an accelerated air stream through an air outlet. The air stream is typically channeled through a tapered, removable blower tube. In addition to providing a more precisely focused air stream, the tapered blower tube also contributes to an air stream of greater velocity.

Because many blower/vac units are designed for hand-held use, they are often made of lightweight materials and utilize lightweight power sources, e.g., small electric-(battery and corded) and gasoline-powered motors. While applicable to blower/vacs having most any power source, the present invention is particularly advantageous for use with corded electric blower/vacs and the remainder of this discussion will focus on the same.

Although size and weight are criteria to consider in the selection of a blower/vac motor, available power is also a factor. Generally speaking, maximum electric current draw for these and other portable consumer devices may be restricted to ensure conformance with conventional household circuits and available electrical equipment (e.g., extension cords). For example, a typical blower/vac may be designed to operate, within acceptable margins, on a 120 volt (60 Hertz), 15 amp circuit.

Nonetheless, a blower/vac motor designed to draw a particular current load under normal operating conditions, e.g., when operating in blower mode with the blower tube installed, may, under certain circumstances, exceed that load. For example, removal of the blower tube may reduce back pressure in and around the impeller, permitting the motor to spin faster and thus draw additional current.

One solution that addresses this "tube removed" condition is to provide a motor that will produce maximum power, e.g., draw maximum current, when the blower tube is removed. However, such motors will inherently operate at a lower speed, and thus draw less current, when the blower tube is installed. Another solution is to provide a motor that is optimized for blower operation, e.g., operation with the blower tube installed. However, as mentioned above, motors optimized for maximum current draw during blower operation may exceed the maximum desired current load if the blower tube is removed.

While either option is acceptable, a solution that yields the desired current draw, i.e., produces the maximum desired motor speed, with the blower tube installed while preventing excessive current draw when the blower tube is removed, would be advantageous. Moreover, a blower/vacuum that utilizes components (e.g., motor and impeller) configured to provide increased air flow, for a given motor size, would be advantageous.

SUMMARY

Embodiments of the present invention may overcome these and other issues with current blower/vacuums. For example, in one embodiment, a portable blower/vacuum is provided that includes: a housing defining an air inlet and an air outlet; a blower tube to removably couple to the air outlet; and an air inlet cover to removably cover the air inlet. The air inlet cover includes: a first attachment member attachable to the blower tube; a second attachment member attachable to the housing; and at least one retaining surface proximate the second attachment member, wherein the retaining surface is configured to abut one or more stop surfaces formed on the housing.

In another embodiment, a portable blower/vacuum is provided that includes: a housing defining an air inlet and an air outlet, wherein the housing includes a resilient cantilevered tab; a blower tube to removably couple to the air outlet; and an air inlet cover to removably cover the air inlet. The air inlet cover includes: a first attachment member for coupling of the air inlet cover to the blower tube; a second attachment member for coupling of the air inlet cover to the resilient cantilevered tab of the housing; and at least one vertical retaining surface located proximate the second attachment member, the vertical retaining surface positionable in close proximity to a corresponding stop surface of the housing.

In yet another embodiment, a portable blower/vacuum is provided that includes a housing defining an air inlet and an air outlet, wherein the housing comprises a resilient flexible tab proximate a rear portion of the housing. A blower tube is also provided to removably couple to the air outlet, wherein the blower tube includes a first attachment receiver. The blower/vacuum further includes an air inlet cover to removably cover the air inlet. The air inlet cover includes: a transverse cylindrical member for connecting the air inlet cover to the first attachment receiver of the blower tube; a transverse lip for snap-fit coupling of the air inlet cover to the resilient flexible tab of the housing; and two spaced-apart retaining surfaces located at opposite ends of the transverse lip, the spaced-apart retaining surfaces operable to bear against corresponding stop surfaces on an outer surface of the housing.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIGS. 7A-7B are partial cut-away views of the blower/vac of FIG. 1, wherein: FIG. 7A illustrates attachment of the air inlet cover to the blower tube and to a housing of the blower/vac; and FIG. 7B is an enlarged view of a portion of FIG. 7A;

Figure 1:
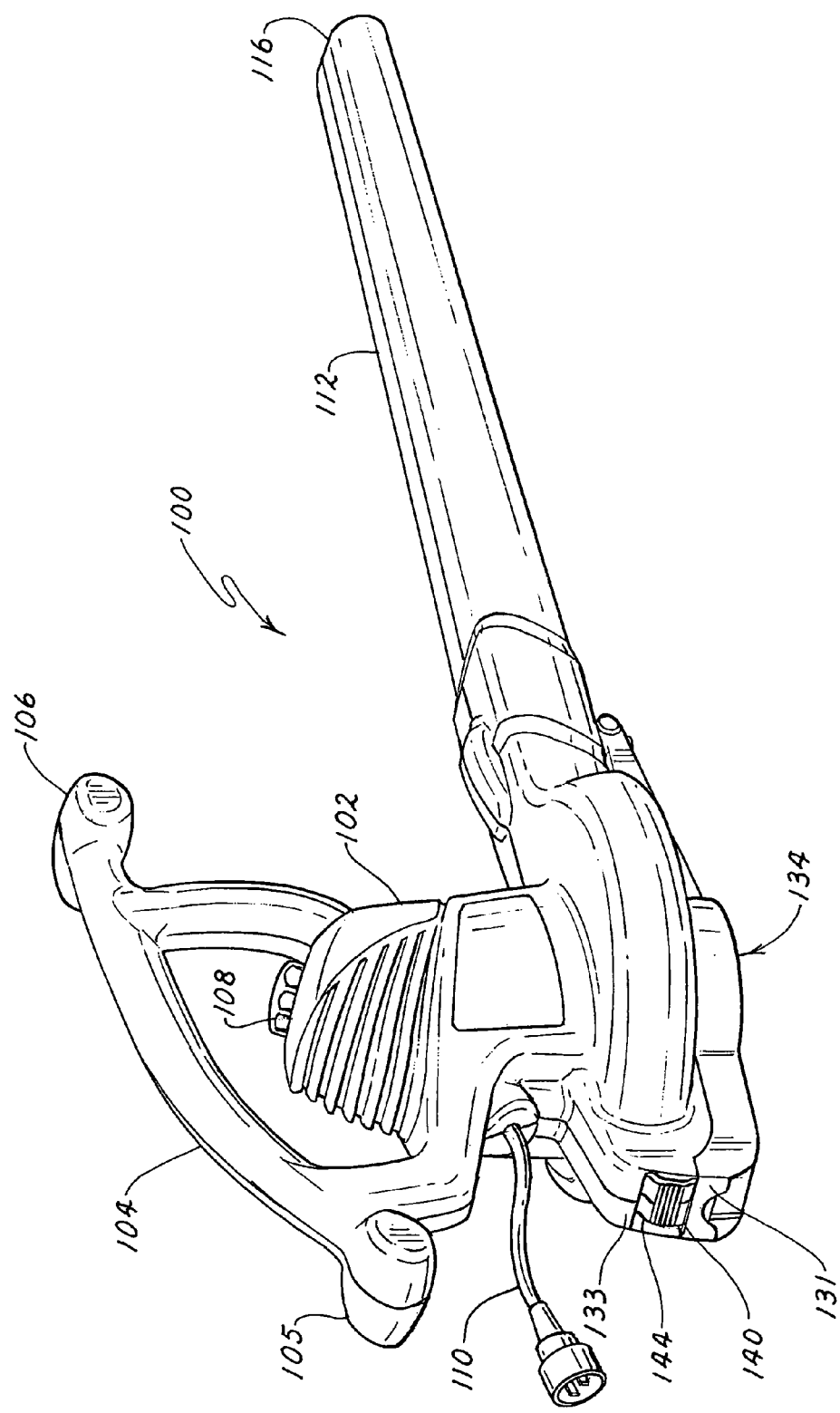
FIG. 1 is a perspective view of a blower/vac in accordance with one embodiment of the invention, the blower/vac shown as configured in a blower mode with a blower tube and air inlet cover installed.

The figures are rendered primarily for clarity and, as a result, are not necessarily drawn to scale.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

This application is related to design patent application No. 29/270,437, filed on even date herewith, the disclosure of which is incorporated herein by reference in its entirety. The disclosures of U.S. Pat. No. 6,442,790 (Svoboda et al.) and U.S. Pat. No. 6,629,818 (Svoboda) are also incorporated herein by reference in their respective entireties.

It is noted that the terms "comprises" and variations thereof do not have a limiting meaning where these terms appear in the accompanying description and claims. Further, "a," "an," "the," "at least one," and "one or more" are used interchangeably herein.

Relative terms such as left, right, forward, rearward, top, bottom, side, upper, lower, above, below, horizontal, vertical, and the like may be used herein and, if so, are from the perspective observed in the particular figure, or as observed when the blower/vacuum is in its typical operating position (see, e.g., FIGS. 1 and 6). These terms are used only to simplify the description, however, and not to limit the scope of the invention in any way.

With reference to the drawings, wherein like reference numerals designate like parts and assemblies throughout the several views, FIG. 1 illustrates a perspective view of a portable, electric blower/vacuum 100 (also referred to herein as "blower" or "blower/vac") in accordance with one embodiment of the invention. While embodiments of the present invention are perceived to be particularly advantageous for use with corded electric blower/vacs, those skilled in the art will appreciate that most any type of blower/vac, e.g., gas-engine powered units or battery-powered units, may benefit from the concepts described and/or illustrated herein. Furthermore, while described herein with application to combined blower/vac units, embodiments of the present invention are equally applicable to units configurable as blower-only or vacuum-only machines.

As the name suggests, embodiments of the blower/vac 100 may be configured to operate in either a blower mode or a vacuum mode. Regardless of the operating mode, exemplary blower/vacs may typically include a blower housing 102 having one or more handles 104, 105, and 106 adapted to receive hands of an operator during use. The housing 102 may further include a power cord 110 for receiving external AC power.

To selectively control delivery of electrical power to a motor (described in more detail below) located within the housing, a switch 108 (also shown in FIG. 2) may also be provided. In one embodiment, the switch 108 is coupled, e.g., in series, between the power cord 110 and the motor. The switch 108 may merely open or close the power delivery circuit or, alternatively, may rheostatically vary the power to the motor to provide adjustable motor speed.

When operating in blower mode, the blower/vac 100 preferably includes a blower tube 112 as shown in FIG. 1. The blower tube 112 has a proximal end which preferably removably couples to an air outlet 114 (see FIGS. 2 and 3) of the housing 102. In one embodiment, the proximal end of the blower tube forms a female portion 117 (see FIG. 2) which slides over a male portion 115 formed by the air outlet 114 (see FIGS. 2 and 3).

The blower tube 112 may taper from the proximal end to a blower tube outlet 116 located at a distal end. The tapered blower tube 112 is advantageous as it permits focusing of the high velocity air stream produced by the blower/vac 100. To further reduce the cross-sectional size of the blower tube outlet 116, an optional air concentrator nozzle insert 113—shown in FIG. 2 and described in more detail in U.S. Pat. No. 6,003,199—may be provided.

Figure 2:
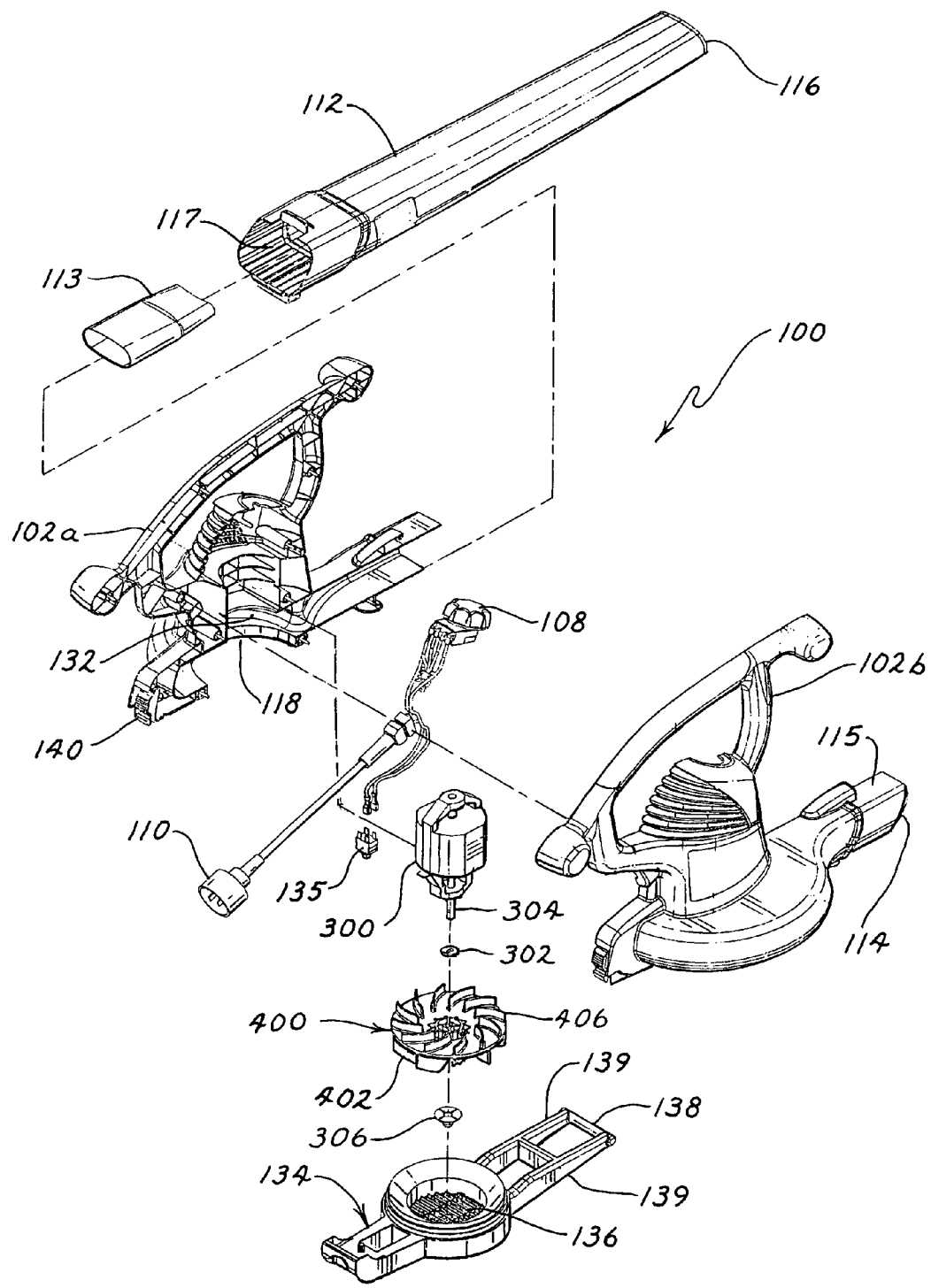
FIG. 2 is an exploded, perspective view of the blower/vac of FIG. 1.

FIG. 2 illustrates the blower/vac 100 of FIG. 1 in an exploded perspective view. As depicted herein, the housing 102 may preferably be formed from mating plastic (e.g., acrylonitrile butadiene styrene (ABS)) halves 102a and 102b which, when assembled, define an interior cavity. The cavity may enclose a power source, e.g., an electric motor 300. The electric motor 300 may be coupled to an impeller 400 via a first end of an output shaft 304 with connecting hardware, e.g., washer 302 and nut 306. When external electrical power is provided to the motor 300, the output shaft 304, and thus the impeller 400, may rotate.

As the impeller 400 rotates, the curved blades or vanes 402 (also shown in FIG. 3), which may be integrally formed with or otherwise attached to the impeller, draw air into a plenum 132 (see FIG. 3) formed within the housing 102. The air may be drawn into the housing 102 through an air inlet opening or air inlet 118 (see FIG. 3), where it may be accelerated and exhausted through the air outlet 114 and the blower tube 112. In some embodiments, the air inlet 118 resides within a first plane on a lower side of the housing 102 while the air outlet 114 generally forms a second plane that may be substantially perpendicular to the first plane.

FIG. 2 further illustrates an air inlet cover 134 in accordance with one embodiment of the present invention. The air inlet cover 134 may removably cover the air inlet 118 as further described below. The air inlet cover 134 may permit air to pass through the air inlet 118 (see FIG. 3) and into the housing 102 while, at the same time, restricting the entry of foreign objects, e.g., debris, as well as fingers of the operator. To achieve this function, the air inlet cover 134 may include a grate or grill portion 136 which covers the air inlet 118 when the cover is installed (see FIG. 4).

Figure 3:
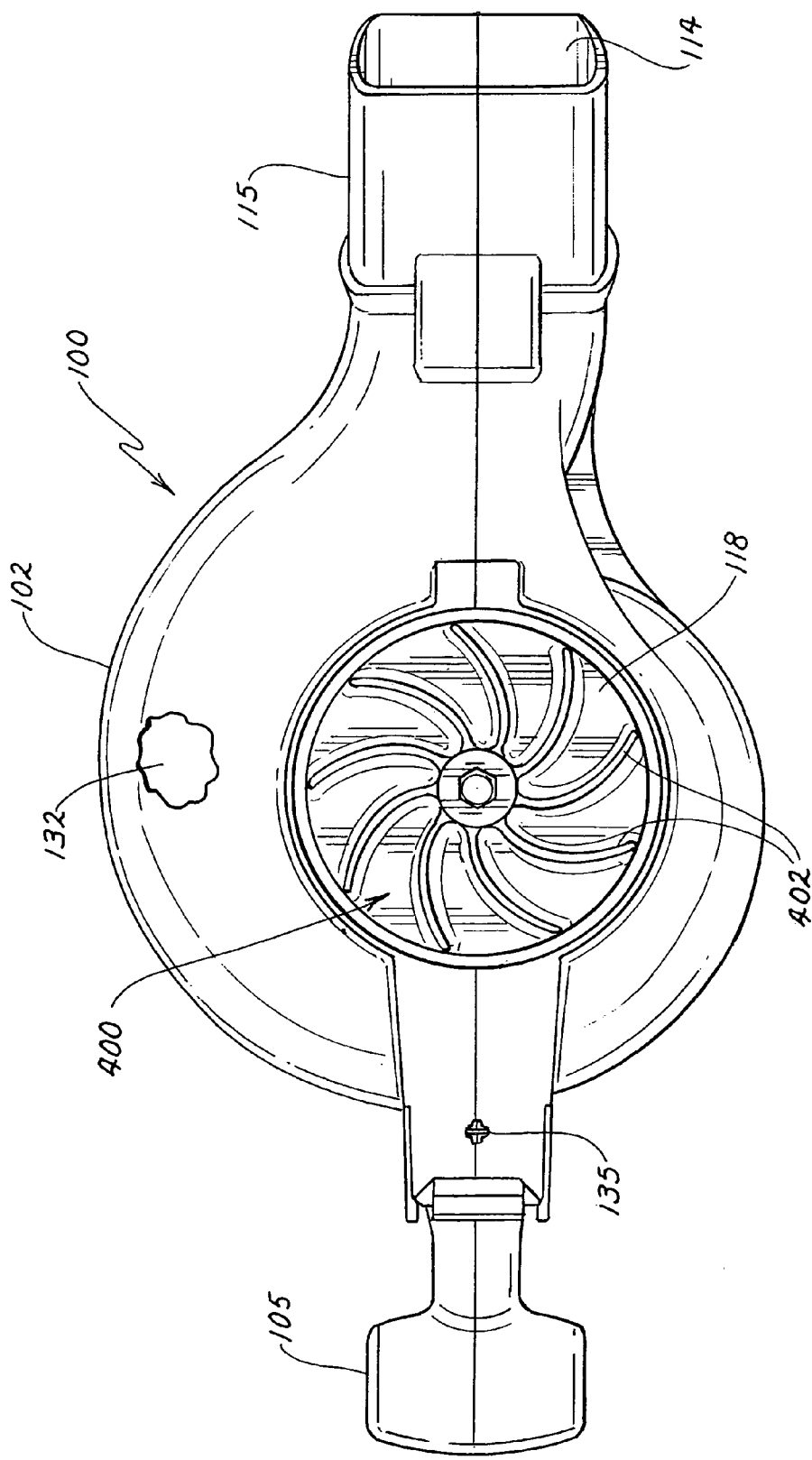
FIG. 3 is a bottom plan view of the blower/vac of FIG. 1 with the blower tube and air inlet cover removed.

An interlock sensor, e.g., a switch 135, explained in more detail below, may also be contained within or otherwise associated with the housing 102 as shown in FIGS. 2 and 3. The interlock switch 135, which may be wired in series with the motor 300, may prevent operation of the motor (and thus movement of the impeller 400) unless the air inlet cover 134 is properly installed.

Figure 4:
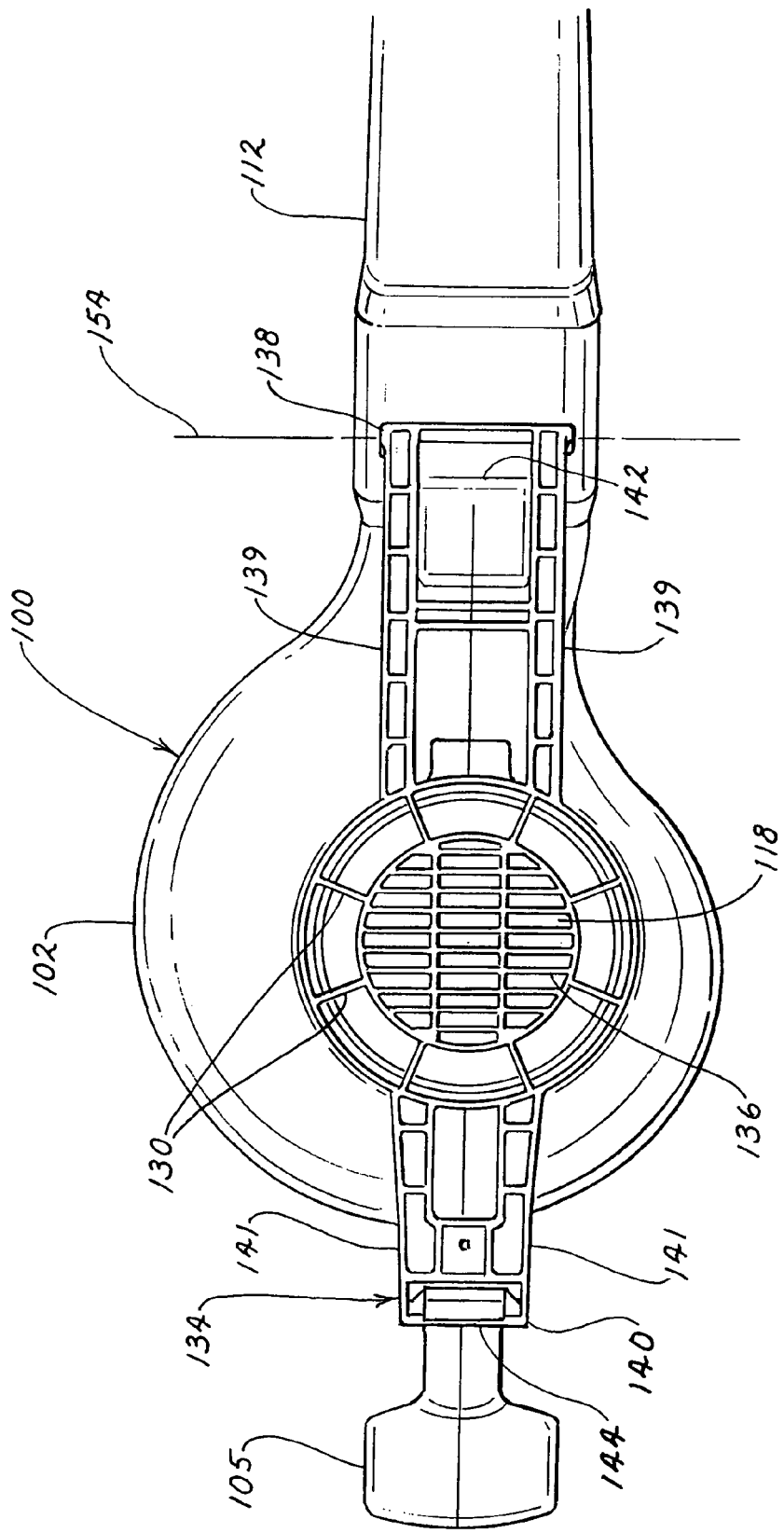
FIG. 4 is a bottom plan view of the blower/vac of FIG. 1 with the blower tube and air inlet cover installed.

An exemplary embodiment of the air inlet cover 134 is illustrated in FIGS. 4-8. As stated above, the air inlet cover 134 may removably couple to the blower/vac 100, e.g., to the housing 102 and blower tube 112, such that the grate portion 136 covers the air inlet 118 as shown in FIG. 4. The air inlet cover 134 may include stiffening members 130 to increase the rigidity of the grate portion 136.

Figure 5:
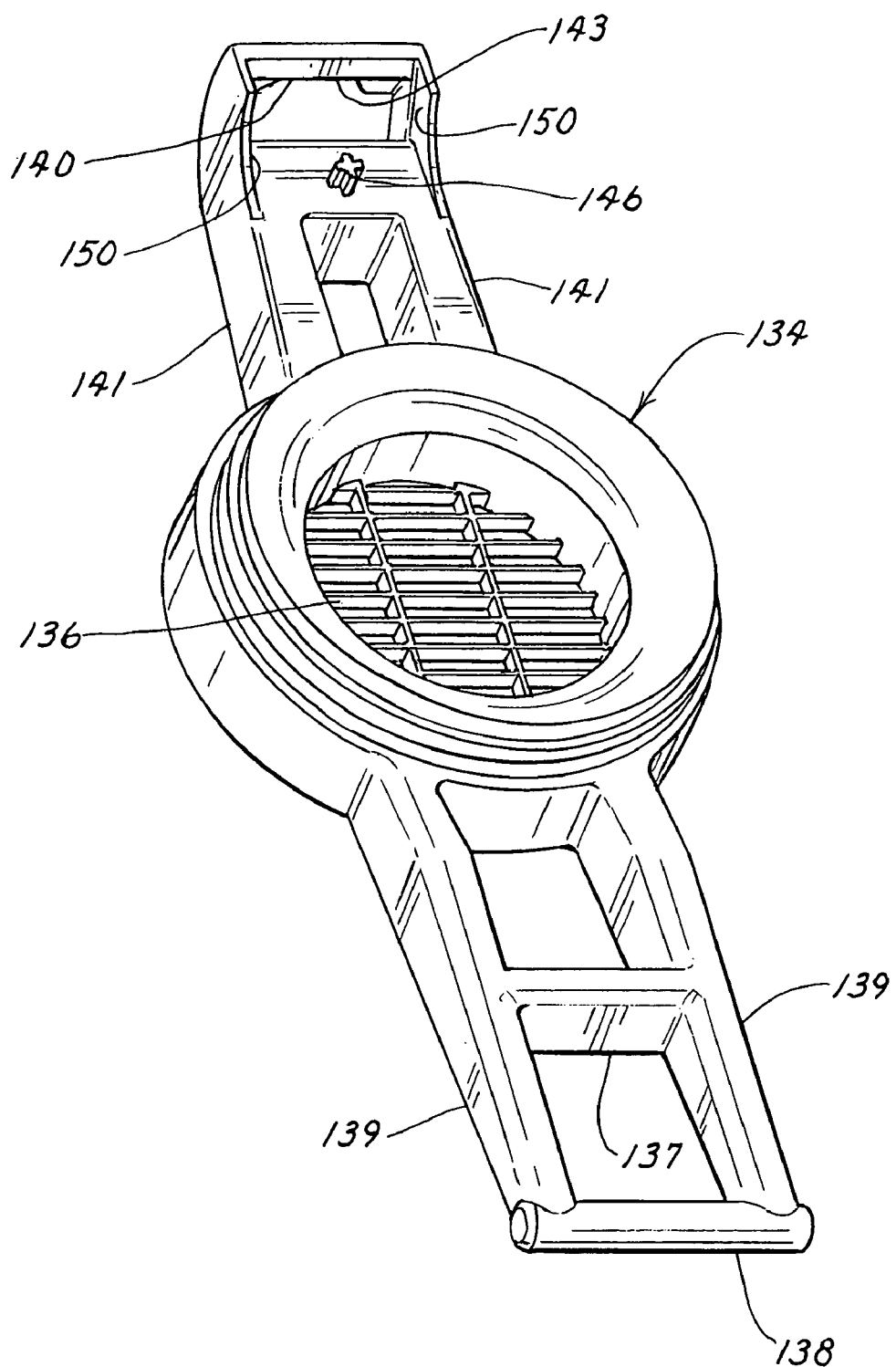
FIG. 5 is an enlarged perspective view of the exemplary air inlet cover shown in FIG. 1.

In addition to the grate portion 136, the air inlet cover 134 may further include a first attachment member 138 and a second attachment member 140 which are shown in more detail in FIG. 5. In one embodiment, the first attachment member 138 is connected to the grate portion 136 by a pair of rails 139 (see FIG. 5). Similarly, the second attachment member 140 may connect to the grate portion 136 by rails 141. Although described herein as interconnected by rails 139 and 141, other embodiments may utilize most any other connecting structure without departing from the scope of the invention.

Figure 6:
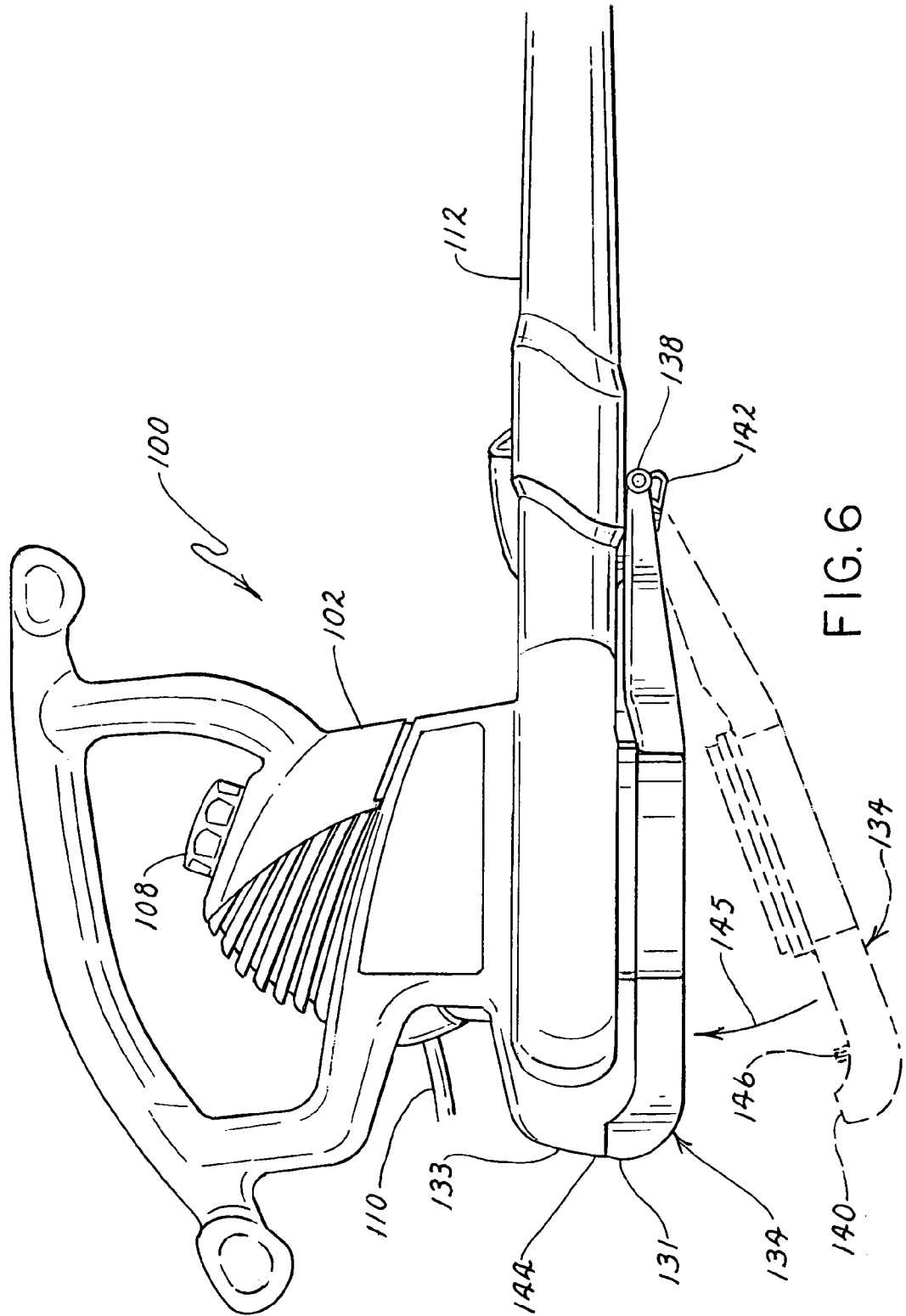
FIG. 6 is an enlarged, side elevation view of the blower/vac of FIG. 1 illustrating attachment, e.g., latching, of the air inlet cover in accordance with one embodiment of the invention.
Figure 7A:
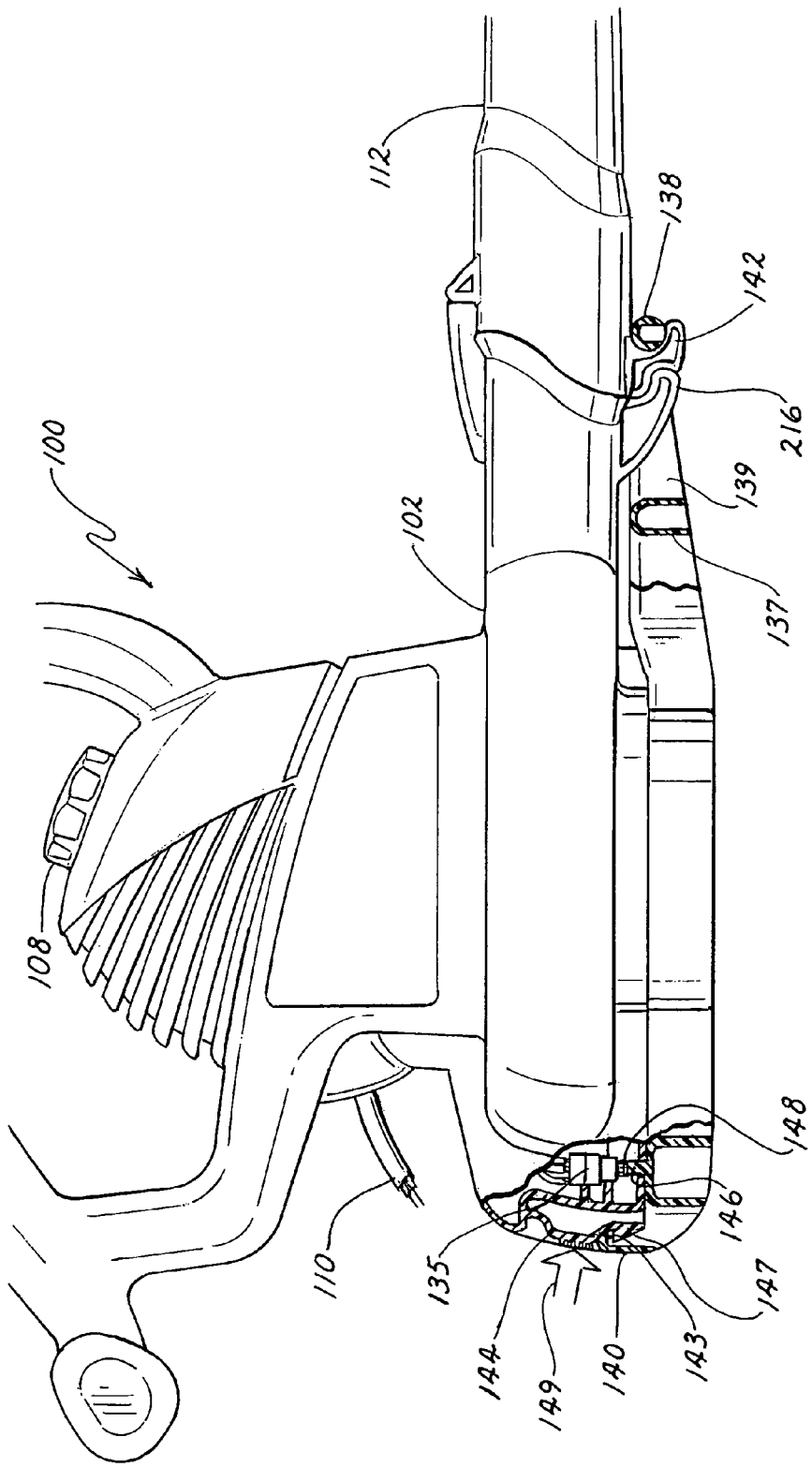

The first attachment member 138 may be received by a first attachment receiver 142 formed on, or otherwise attached to, the blower tube 112 (see, e.g., FIGS. 4, 6, and 7A). The second attachment member 140 may likewise be received by a second attachment receiver 144 formed on or otherwise attached to a rear portion of the housing 102 (see, e.g., FIGS. 1, 6, and 7A-7B). As a result, the first attachment member 138 may be attachable to the blower tube 112, while the second attachment member 140 may be attachable to the housing 102.

The air inlet cover 134, including the first and second attachment members 138 and 140, may be configured such that engagement of both the first and second attachment members with the first and second attachment receivers 142 and 144, respectively, securely attaches the air inlet cover 134 to both the blower tube 112 and the housing 102. "Secure attachment," "secure engagement," and "secure coupling" are used herein to refer to engagement of components in such a way that unintended disengagement or decoupling during normal operation is generally prevented. In the illustrated embodiment, the blower/vac 100 is configured such that secure coupling of the second attachment member 140 with the second attachment receiver 144 generally occurs only after proper engagement of the first attachment member 138 with the first attachment receiver 142 as further described below.

FIG. 5 is an enlarged perspective view of the exemplary air inlet cover 134. As illustrated in this view, the first attachment member 138 may have a shape that is generally cylindrical (or at least partially cylindrical), e.g., forming a transverse cylindrical member or pin, and spans between the rails 139 (a supporting rib 137 may also be included to strengthen the cover 134). The first attachment receiver 142 (see, e.g., FIGS. 6 and 7A) may form a receiving or mating element, e.g., a J-shaped hook or open-sided hinge, adapted to receive the cylindrically-shaped first attachment member 138. The first attachment receiver 142 may receive the first attachment member 138 with clearance or, alternatively, with a slight interference or snap fit.

The terms attachment "member" and attachment "receiver" are used herein only to simplify the description of the illustrated embodiments. Broadly speaking, the terms may include most any interconnecting structures. For instance, other embodiments of the invention may reverse the location of the first attachment member and the first attachment receiver, e.g., the first attachment member 138 could be located on the blower tube 112 while the first attachment receiver 142 could be located on the air inlet cover 134.

Once the first attachment member 138 is in place, it may bear against a corresponding interior surface of the first attachment receiver 142 as represented in FIGS. 6 and 7A. As one can appreciate, the air inlet cover 134 may be disengaged from the blower tube 112 (provided that the second attachment member 140 has not yet been engaged with the second attachment receiver 144) by sliding the cover in the forward direction (to the right in FIGS. 6 and 7A) until the first attachment member disengages from, e.g., slides out of, the first attachment receiver 142.

With the first attachment member 138 engaged with the first attachment receiver 142, the air inlet cover 134 may pivot, about the first attachment receiver, towards the housing 102 as indicated by arrow 145 in FIG. 6. The second attachment member 140 may thus rotate towards the second attachment receiver 144 (as indicated by arrow 145), where it may ultimately be latched thereto.

Figure 7B:
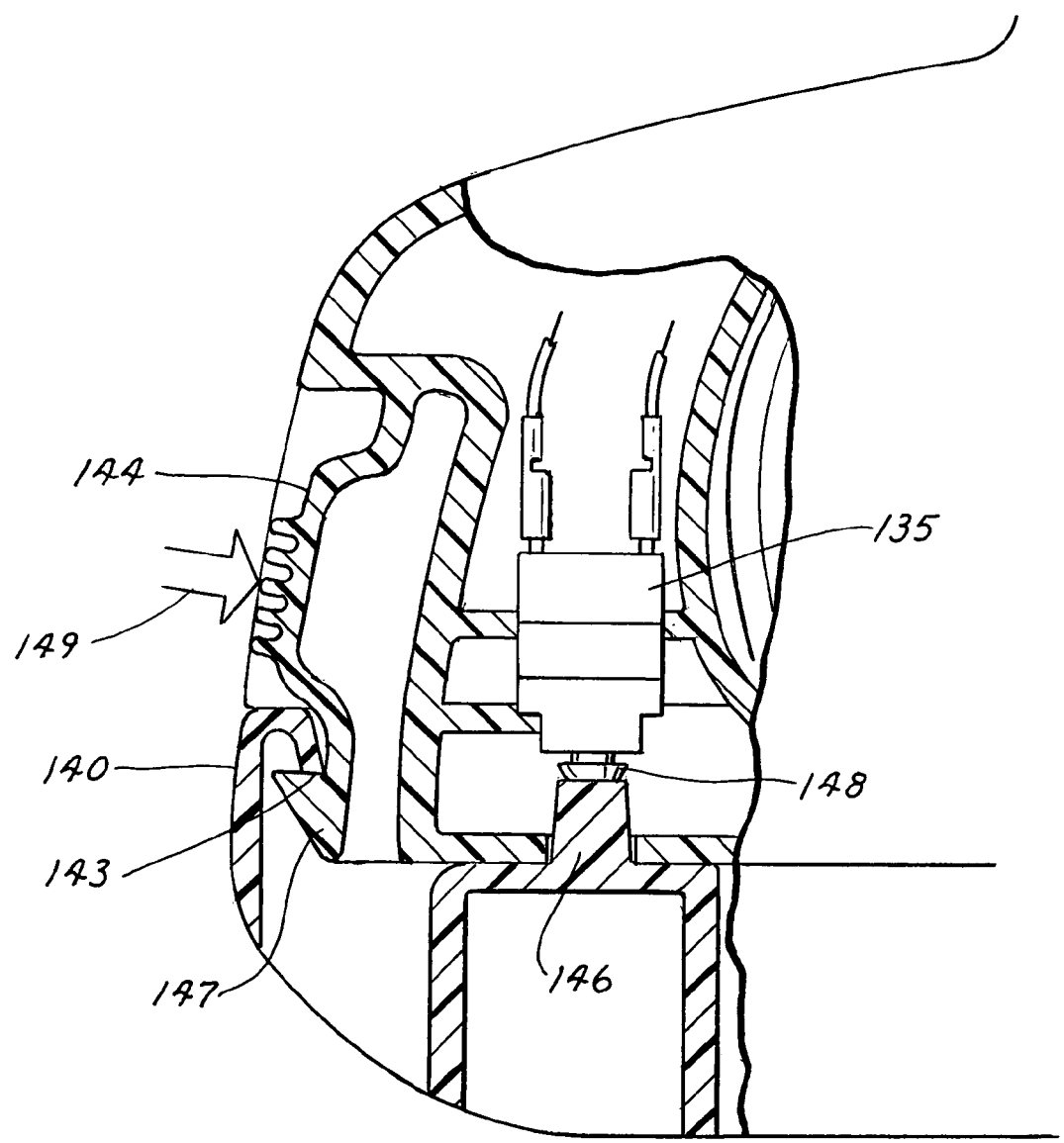

FIGS. 7A and 7B are partial cutaway views of the blower/vac 100 after the air inlet cover 134 is fully coupled to the blower/vac, e.g., after it is moved to a first operating or latched position (FIG. 7B is an enlarged view of a portion of FIG. 7A). As shown in both FIGS. 5 and 7A-7B, the second attachment member 140 is preferably formed by a substantially rigid transverse lip 143. The lip is preferably integrally formed with, or otherwise attached to, a rearward portion of the air inlet cover 134. The second attachment receiver 144, on the other hand, may, at least in one embodiment, include one or more flexible, resilient tabs, e.g., cantilevered tabs 147, such that the second attachment member (e.g., lip 143) may engage the second attachment receiver with a snap fit as shown in FIGS. 7A-7B.

The term "snap fit," as used herein, describes the joining of one resilient flexible member with another flexible or rigid member. The flexible member may deflect initially upon contact with the other member, but ultimately returns or "snaps back" to its undeflected, or to a partially deflected, position, thereby securing one member with respect to the other. Thus, in the illustrated embodiment, once the second attachment member 140 and second attachment receiver 144 are completely engaged (e.g., via snap fit), the air inlet cover 134, and thus the blower tube 112, are securely engaged with the housing 102.

As the air inlet cover 134 is pivoted in the direction 145 from an unlatched position (shown in broken lines in FIG. 6) to the latched position (shown in solid lines in FIGS. 6 and 7A), an interlock engagement member, e.g., protrusion 146, located on the air inlet cover may protrude into the housing 102 and engage an actuator button 148 associated with the interlock switch 135. When the air inlet cover 134 is in the latched position, e.g., when the lip 143 of the second attachment member 140 latches with the tab 147 of the second attachment receiver 144 as shown in FIG. 7B, the protrusion 146 closes the interlock switch 135, permitting operation of the electric motor 300 (see FIG. 2). When the second attachment member 140 is disengaged, e.g., unlatched, from the second attachment receiver 144, the button 148, which is preferably biased outwardly, returns to its extended position. As a result, the interlock switch 135 returns to its normally open position, preventing operation of the electric motor 300.

In the illustrated embodiment (see, e.g., FIG. 6), the air inlet cover 134 may be bound by an aft surface 131 that is flush with a proximal aft surface 133 of the housing 102. As shown in FIGS. 1 and 6, such a configuration yields a relatively smooth shape or structure around the second attachment member 140. In addition to a desired aesthetic appearance, this flush configuration provides other benefits including, for example, recessing of the flexible second attachment receiver 144. In addition, the air inlet cover 134 may further be configured such that it is contained within a plan envelope defined by the housing 102. For example, when viewed in a bottom plan view (see, e.g., FIG. 4), the air inlet cover (when in the latched position of FIGS. 4 and 7A) may not extend generally beyond the footprint or perimeter of the housing 102.

Figure 8:
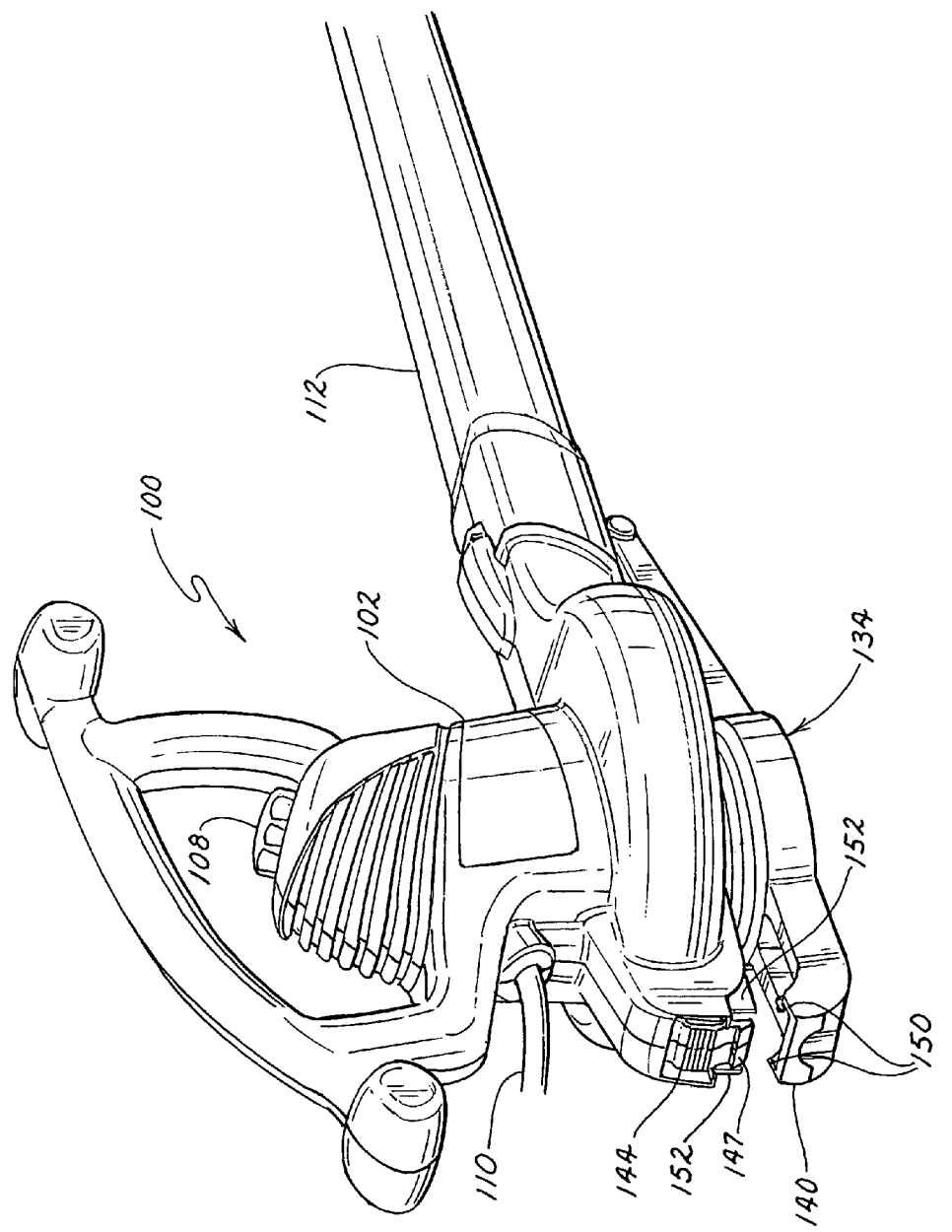
FIG. 8 is a perspective view of the blower/vac of FIG. 1 with the air inlet cover shown prior to reaching a latched position.

FIG. 8 illustrates a perspective view of the blower/vac 100 with the air inlet cover 134 in the unlatched position. As shown in this view, the second attachment receiver 144 may include the two cantilevered, flexible tabs 147 (also visible in FIGS. 7A-7B). These tabs 147 may be manipulated, e.g., pressed inwardly as indicated by the arrow 149 in FIGS. 7A-7B, to disengage the tabs from the lip 143 of the second attachment member after use. The first attachment member 138 of the air inlet cover 134 may then be disengaged from the first attachment receiver 142 as described above. Thus, the air inlet cover 134 may be separated from both the housing 102 and the blower tube 112, after which the blower tube may be separated from the housing.

As further shown in FIG. 8, the air inlet cover 134 may also include at least one retaining surface, e.g., vertical retaining surface 150 (see also, e.g., FIG. 5), that, in the illustrated embodiment, is located proximate, e.g., lateral to, the second attachment member 140. The vertical retaining surface 150 may be configured in close proximity to one or more stop surfaces 152 formed on an outer surface of the housing 102. In the illustrated embodiment, the air inlet cover includes two spaced-apart and preferably parallel retaining surfaces 150, each configured to contact, e.g., bear against, one of the stop surfaces 152 of the housing 102. The surfaces 150 may be located at opposite ends of the second attachment receiver 144. However, this configuration is not limiting as covers having more or less retaining surfaces are certainly possible without departing from the scope of the invention. For instance, a single retaining surface could be provided that could be received within a slot formed in the housing. Moreover, while the retaining surfaces 150 are illustrated herein as being generally vertical and planar, e.g., contained within a vertical plane, other embodiments may utilize retaining surfaces having other configurations and shapes, both planar and non-planar, without departing from the scope of the invention.

Each of the retaining surfaces 150 may be configured to abut one of the stop surfaces 152 to resist forces that might displace the air inlet cover transversely to (e.g., to the side of) the housing. Such forces may result in higher than anticipated force on the interlock protrusion 146, as well as on the second attachment member 140 and the second attachment receiver 144.

To operate the blower/vac 100 in blower mode, the blower tube 112 (FIG. 1) may first be coupled to the air outlet 114 (See, e.g., FIG. 3) of the housing 102. In one embodiment, the female portion 117 (see FIG. 2) of the proximate end of the blower tube 112 slides over the male portion 115 (see FIG. 3) of the air outlet 114. As indicated in FIG. 2, the blower tube 112 may include small structural ribs that provide increased rigidity to the blower tube and may further assist with its attachment to the housing 102. Preferably, the shape of the both the blower tube 112 and the outlet 114 prevents coupling of the blower tube in any but the desired orientation, e.g., with the first attachment receiver 142 extending downwardly.

Once the blower tube 112 is in place, the first attachment member 138 may be engaged with the first attachment receiver 142 as shown in broken lines in FIG. 6 and described above. Thereafter, the air inlet cover 134 may be pivoted in the direction 145 (see FIG. 6) about the first attachment member 138 until the second attachment member 140 engages the second attachment receiver 144 with a snap fit as already described above. As the second attachment member 140 and second attachment receiver 144 are engaged, the interlock protrusion 146 contacts the button 148 and closes the interlock switch 135, thereby permitting operation of the motor 300.

Engagement of the second attachment member 140 with the second attachment receiver 144 alone is preferably incapable of retaining the air inlet cover 134 to the blower/vac 100. As a result, the air inlet cover 134, in one embodiment, may not be fully coupled to the housing 102, nor may the interlock switch 135 be securely engaged, without first engaging the first attachment member 138 with the first attachment receiver 142. Stated another way, the blower/vac 100 generally may not operate in blower mode unless both the blower tube 112 and the air inlet cover 134 are installed as described herein. Accordingly, blower/vacs 100 of the present invention may utilize motors sized for maximum performance with the blower tube 112 installed without concern for potential electrical current overdraw when the blower tube is removed. Other advantages may also be realized. For example, attachment of the separate air inlet cover 134 and blower tube 112 may be detected with the use of a single interlock sensor, e.g., switch 135.

Although not depicted, additional mechanisms for securing the blower tube 112 to the housing 102 may also be provided such that the blower tube 112 may be further secured to the housing independent of the air inlet cover 134.

Still other embodiments are possible. For example, as mentioned above, the first attachment member 138, e.g., the pin, could be located on the blower tube 112 while the first attachment receiver, e.g., the hook element, could be located on the air inlet cover 134. Moreover, the first and second attachment members and attachment receivers may be configured to couple in alternative ways. For instance, instead of pivoting about a transverse axis 154 (e.g., the axis of the first attachment member 138 as shown in FIG. 4), the first attachment member 138 and first attachment receiver 142 may be configured to permit pivoting of the air inlet cover 134 about most any axis, e.g., about an axis generally parallel to the axis of the impeller 400. The second attachment member 140 and second attachment receiver 144 could also be reconfigured to accommodate such alternative configurations without departing from the scope of the invention.

In still other embodiments, the air inlet cover 134 could be attached via translational displacement instead of via pivotal movement as described herein. For instance, after engaging the first attachment member 138 with first attachment receiver 142, the air inlet cover 134 could be displaced, e.g., pulled, rearwardly, preferably against a forwardly-biasing force, to engage a modified second attachment member 140 with a modified second attachment receiver 144.

Figure 9:
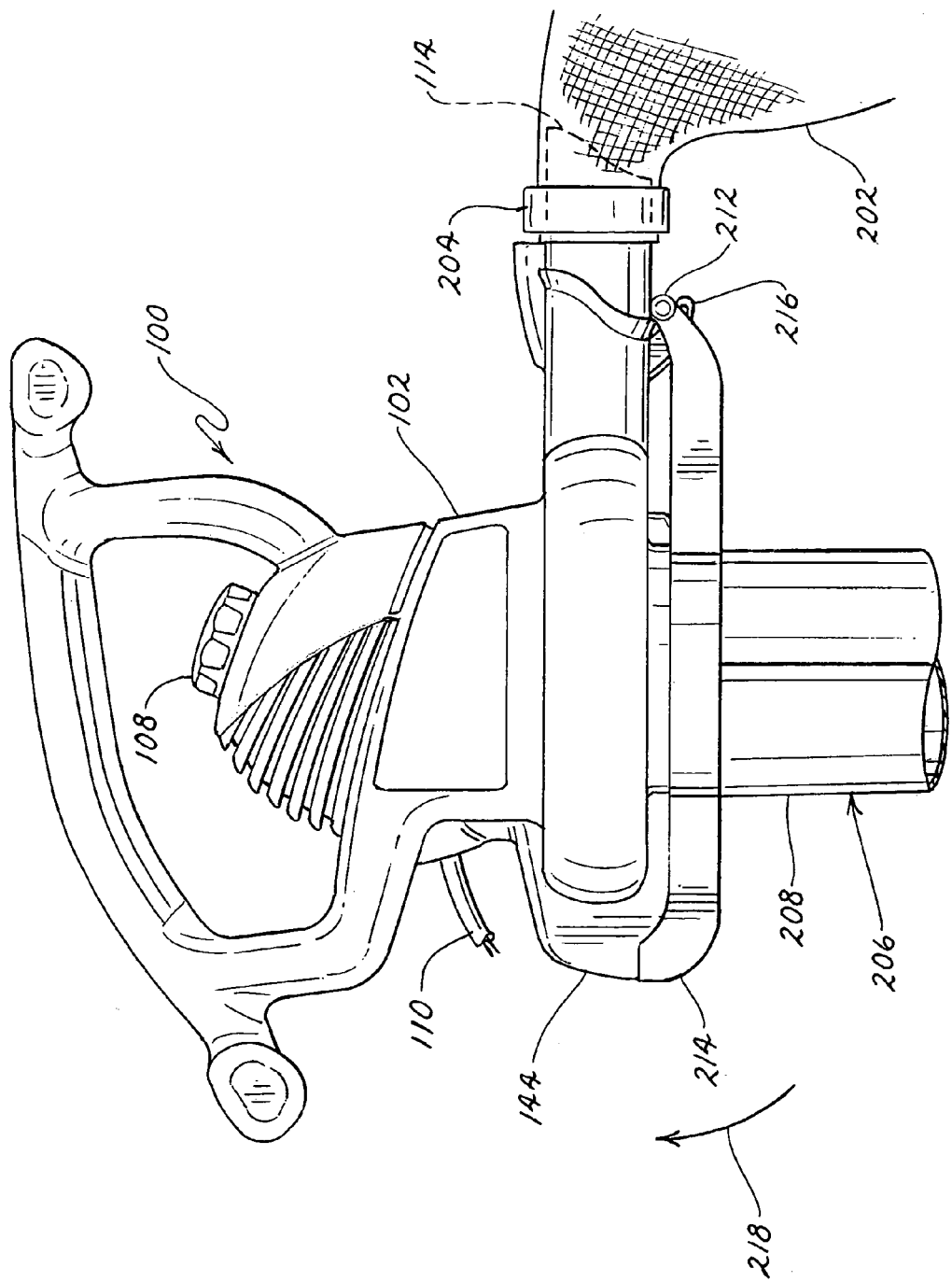
FIG. 9 is a side elevation view of the blower/vac of FIG. 1 as it may be optionally configured in a vacuum mode in accordance with one embodiment of the invention.

FIG. 9 illustrates the blower/vac 100 as it may be configured for use as a vacuum. In this configuration, the air inlet cover is replaced with a vacuum tube assembly 206 including an upper tube 208. The upper tube 208 may include attachment features that permit coupling to the housing 102 at the air inlet opening 118 as further described below. The vacuum tube assembly 206 may also include a lower tube (not shown) that forms a vacuum inlet.

To collect vacuumed debris, the blower tube and air inlet cover 134 may be removed and a vacuum collection container, e.g., a collection bag 202, may be attached or coupled to the air outlet 114 via a vacuum bag collar 204 or the like. In some embodiments, the bag 202 and collar 204 are permanently or semi-permanently coupled, i.e., they are not intended to be separated by the operator. The vacuum tube assembly 206 may also be attached to the housing 102, in place of the air inlet cover, as further described below.

During operation, the impeller 400 may draw air and entrained debris through the vacuum tube assembly 206. The impeller 400 may, in addition to generating vacuum air flow, mulch or shred the debris before expelling it out of the air outlet 114 and into the vacuum collection bag 202.

Figure 10:
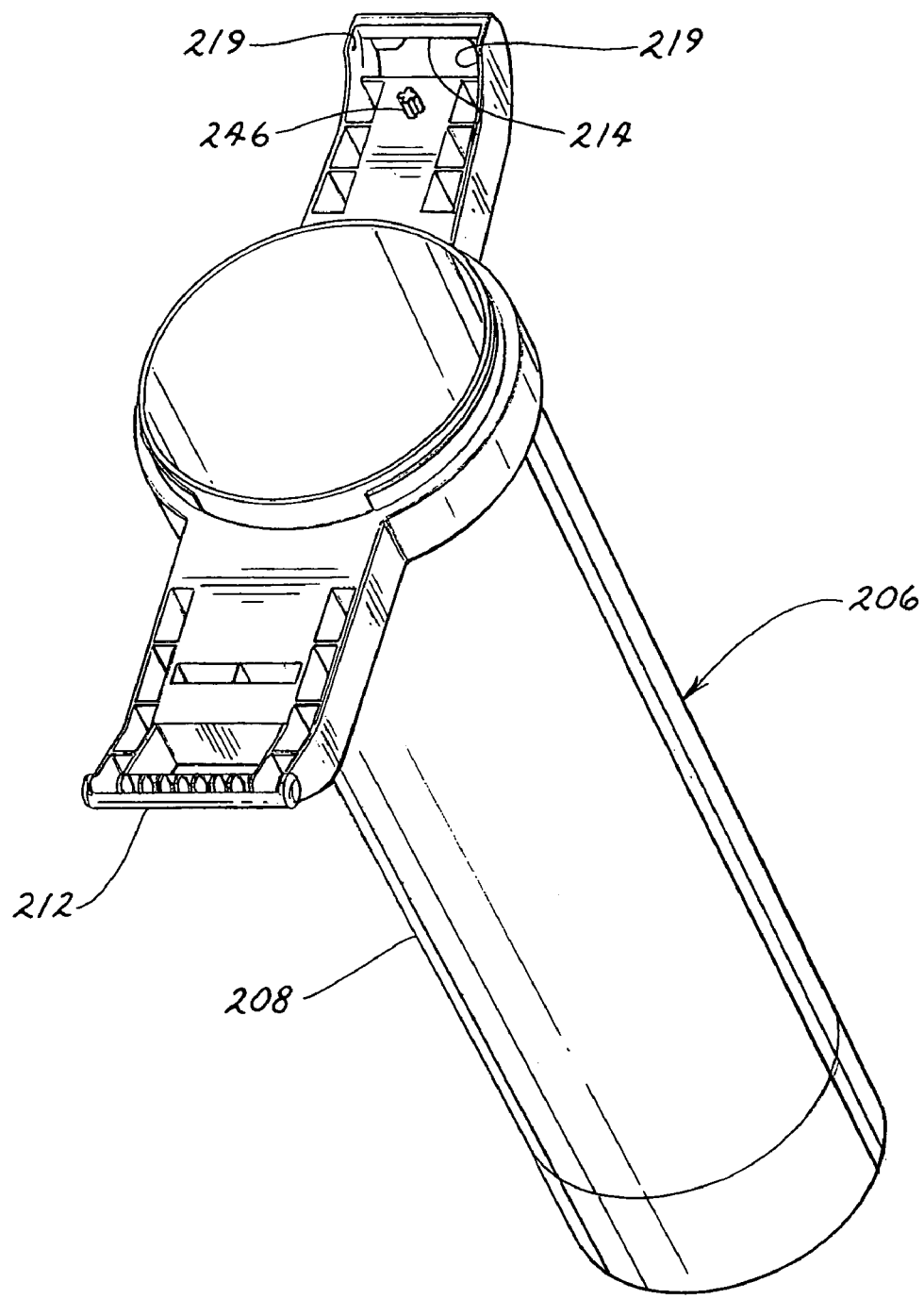
FIG. 10 is a perspective view of an upper vacuum tube for use with the blower/vac when the latter is in the vacuum mode of FIG. 9.

FIG. 10 illustrates the attachment features of the upper tube 208. As clearly illustrated in this view, the upper tube 208 of the vacuum tube assembly 206 may include a first vacuum attachment member 212, similar in most respects to the first attachment member 138, for attachment of the vacuum tube assembly to a forward portion of the housing 102. It may further include a second vacuum attachment member 214, similar in most respects to the second attachment member 140, for attachment of the vacuum tube assembly to a rear portion of the housing 102.

As shown in FIG. 9, the first vacuum attachment member 212 may engage a first vacuum attachment receiver 216 located on the forward portion of the housing 102. The first vacuum attachment receiver 216 may be similar in most respects to the first attachment receiver 142 (see FIG. 7A), except that it may be integrally formed with or otherwise attached to the housing 102 instead of the blower tube 112. If desired, the first vacuum attachment receiver 216 could be formed integral with, or otherwise connected to, the bag 202.

The first vacuum attachment receiver 216 may be located in the same vicinity as (e.g., immediately to the rear of) the first attachment receiver 142 described above when the blower tube 112 is installed. In fact, in one embodiment, the first attachment receiver 142 of the blower tube 112 may nest within the first vacuum attachment receiver 216 of the housing when the blower tube 112 is coupled to the air outlet 114 as shown, for example, in FIG. 7A.

Once the first vacuum attachment member 212 is engaged with the first vacuum attachment receiver 216, the upper tube 208 may pivot about the receiver 216 in the direction 218 (see, e.g., FIG. 9) until the second vacuum attachment member 214, e.g., a second transverse lip, engages the second attachment receiver 144 of the housing 102. The engagement of the second vacuum attachment member 214 with the second attachment receiver 144 may be via a snap fit as the second vacuum attachment member may be substantially similar to the second attachment member 140 already described herein.

As with the air inlet cover 134, an interlock protrusion 246 may be provided on the upper tube 208 (see, e.g., FIG. 10) to engage the interlock switch 135 in a manner similar to that already described above with respect to the protrusion 146. The upper tube 208 may also include retaining surfaces, e.g., vertical retaining surfaces 219, similar to the corresponding surfaces 150 of the air inlet cover 134 (e.g., the surfaces 219 may be located immediately outboard of stop surfaces 152 (see FIG. 8) of the housing 102). Accordingly, the upper tube 208 may attach to the housing 102 in a manner similar to that of the air inlet cover 134 described above.

Figure 11:
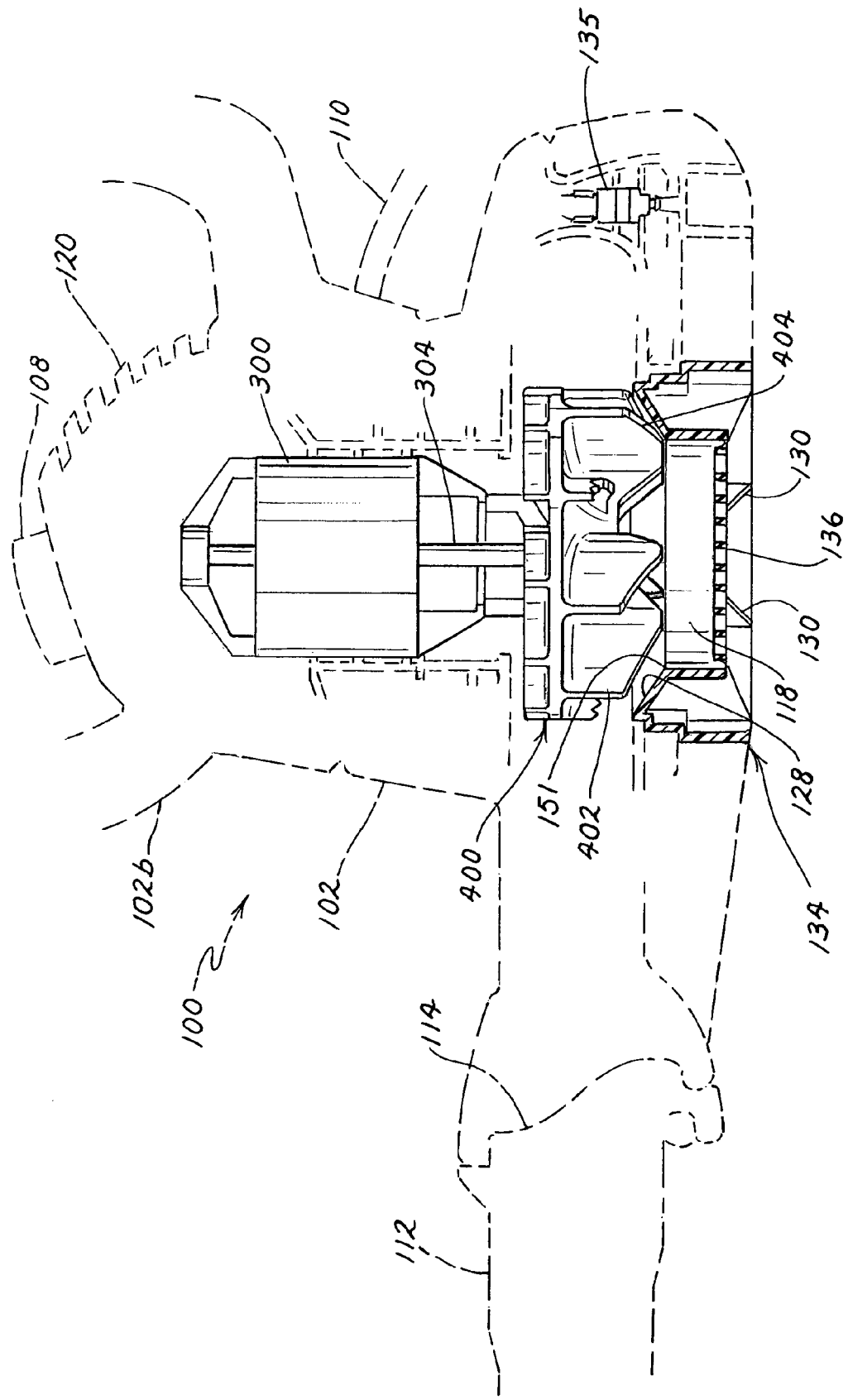
FIG. 11 is a cut-away side elevation view of the blower/vac of FIG. 1 with the air inlet cover shown partially in section, wherein an impeller and motor in accordance with exemplary embodiments of the invention are clearly visible.

Having described various aspects of the air inlet (including the air inlet cover and the upper vacuum tube), attention is now directed to exemplary embodiments of the motor 300 and impeller 400. FIG. 11 illustrates a cut-away side elevation view of the blower/vac 100 with the air inlet cover 134 partially illustrated in section. As clearly shown in this view, the halves (e.g., the half 102b) of the housing 102 may include provisions for receiving and securing the motor 300. As illustrated in FIG. 2, the impeller 400 may attach to the output shaft 304 of the motor 300. When the motor is activated, the impeller 400 rotates, whereby the impeller blades 402 draw air in through the air inlet 118 and expel it through the air outlet 114 of the housing and through the blower tube 112.

As shown in FIG. 11, the air inlet cover 134 may define a frusto-conical surface 128 proximate the impeller blades 402. Preferably, each impeller blade 402 is configured with an outer surface having an arc of rotation that closely corresponds to the frusto-conical surface 128. The impeller 402 is described in more detail below. An opposite, e.g., outer side, of the air inlet cover 134 may also form a frusto-conical surface. However, while illustrated as utilizing frusto-conical surfaces, other shapes are certainly possible. For example, bell-mouth and arc-shaped surfaces could be utilized without departing from the scope of the invention.

An opposite, e.g., upper, side of the impeller 400 may include cooling vanes or blades 406 as illustrated in FIGS. 2 and 11. The cooling blades 406 may, when the impeller is rotated, draw air through openings 120 formed in the housing 102. This air is pulled through the motor 300 and exhausted through the air outlet 114. As a result, the motor 300 may be air cooled during operation.

Figure 12:
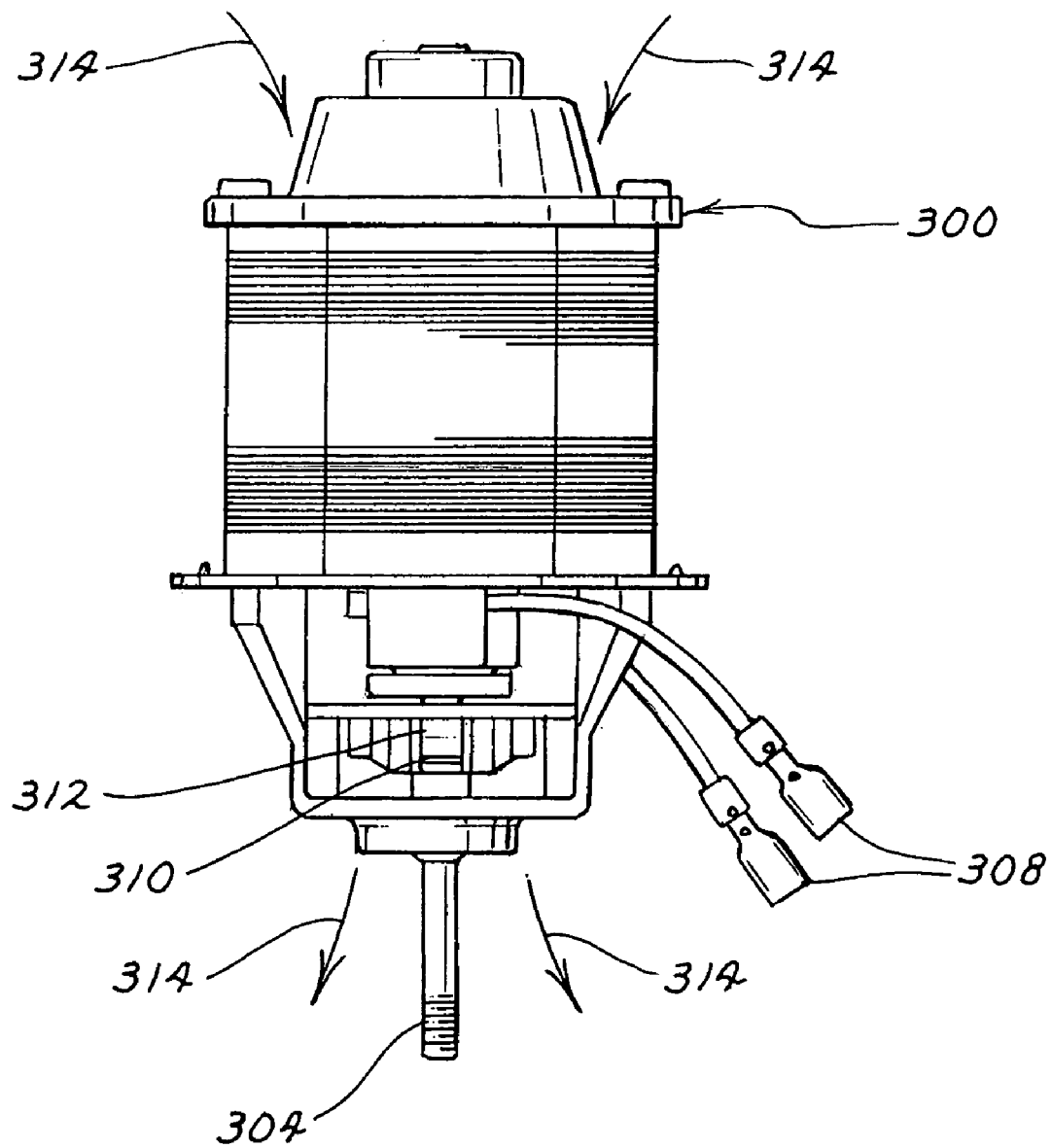
FIG. 12 is an enlarged side elevation view of the motor of FIG. 11.

FIG. 12 is an enlarged side elevation view, of the motor 300. As illustrated in this view, the motor may include two electrical leads 308 that permit connection to electrical power. In one embodiment, the motor is a 12 Amp, E-frame motor configured as further described below. However, motors of other sizes/configurations are also contemplated.

The blower/vac motor 300 may include a commutator 310 and brushes 312. However, unlike conventional blower/vac motors, the motor 300 may locate the commutator 310 and brushes 312 at a lower end, e.g., proximate the impeller 400, of the motor. This configuration offers several advantages. For example, cooling air 314 flowing into the motor 300 (via the openings 120 shown in FIG. 11) is not blocked by the commutator and brushes as would potentially be the case with locating these components near the top of the motor. Moreover, brush dust produced during motor operation is not pulled over the internal motor parts as it may be with a conventional blower/vac motor. As a result the cooling air 314 may pass through the motor housing with potentially less interference, and may further reduce the distribution of brush dust onto internal motor parts.

Figure 13:
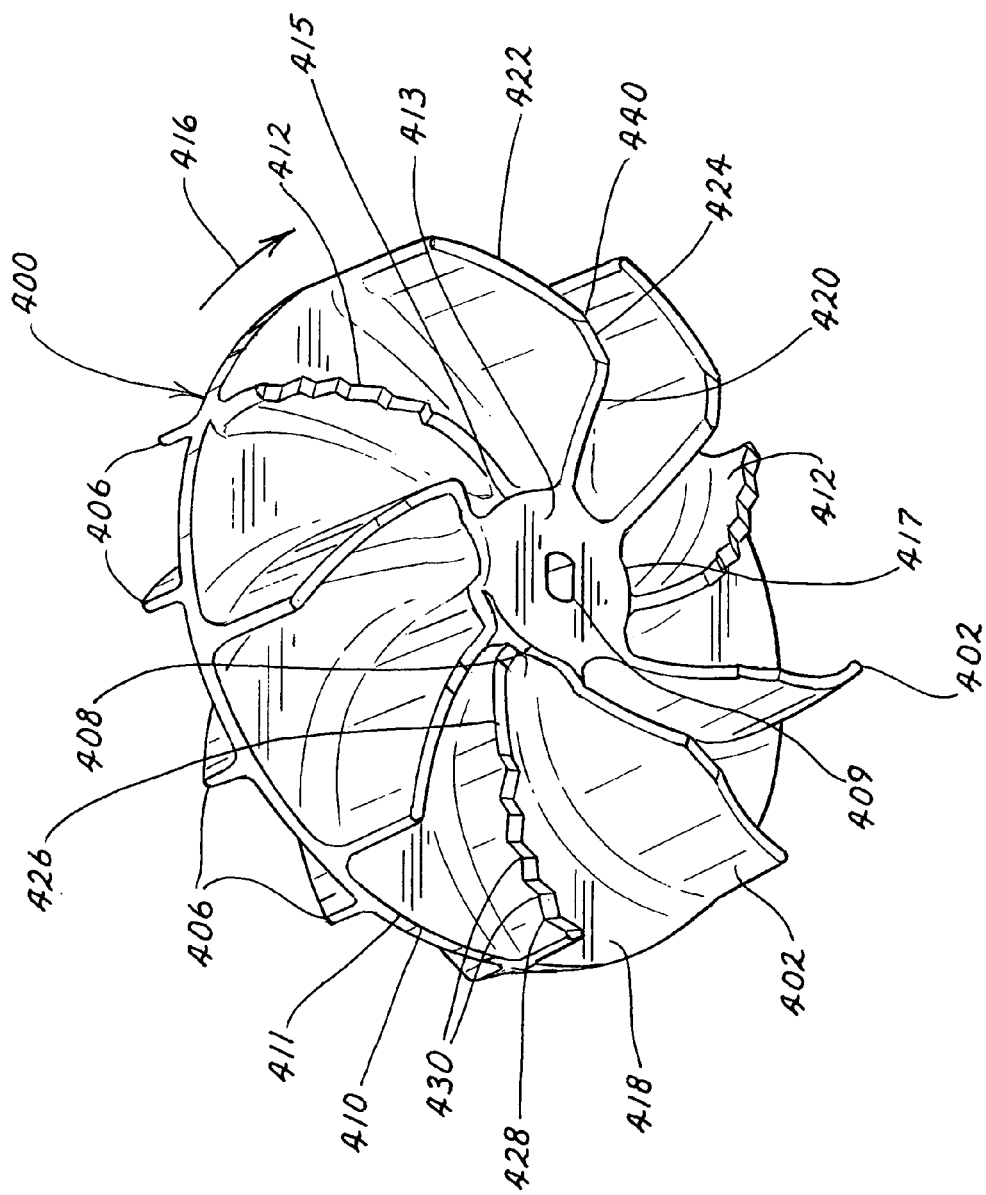
FIG. 13 is a bottom perspective view of the impeller of FIG. 11.
Figure 14:
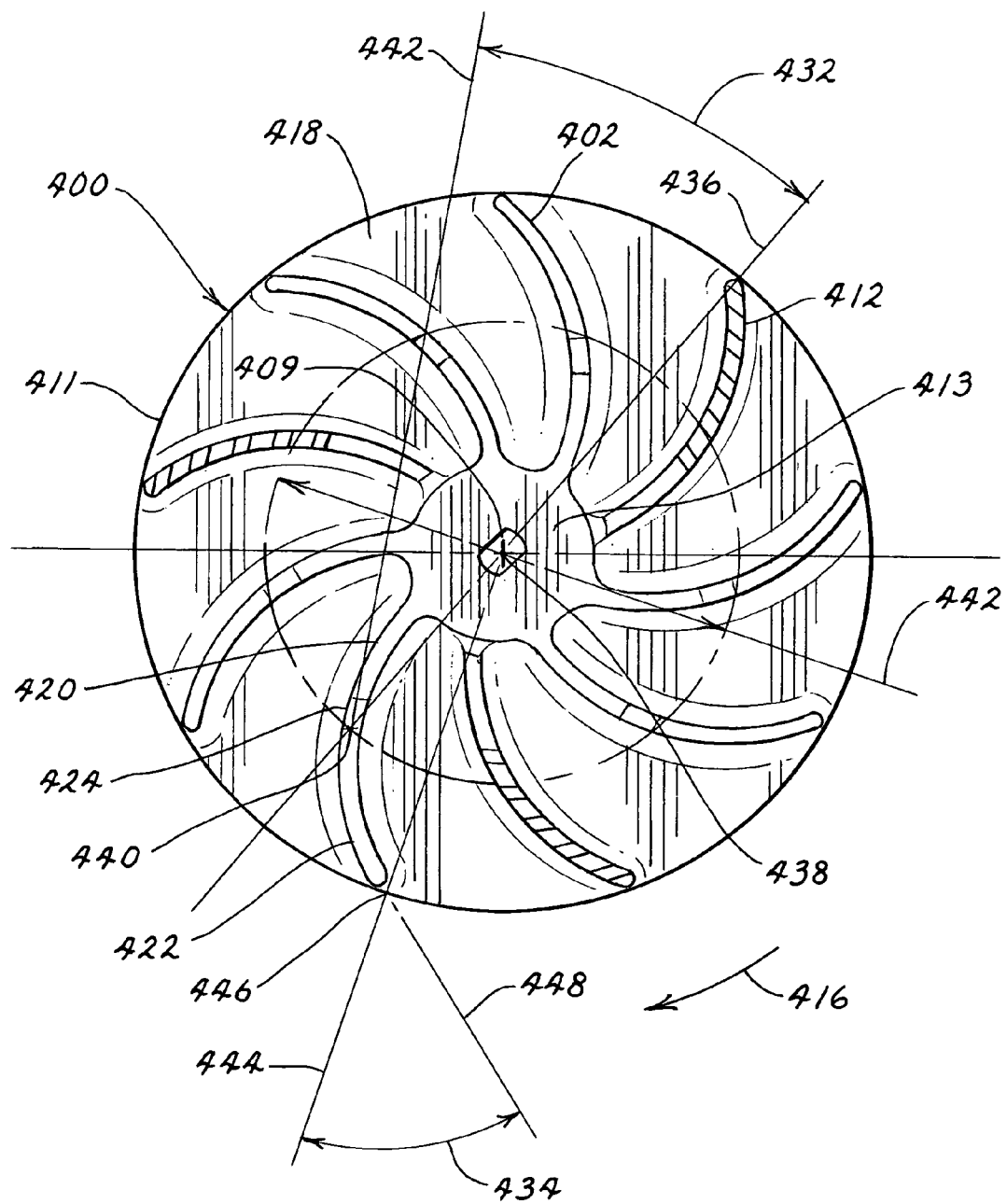
FIG. 14 is a bottom plan view of the impeller of FIG. 11.

FIGS. 13 and 14 illustrate the exemplary impeller 400, wherein FIG. 13 is a bottom perspective view and FIG. 14 is a bottom plan view. The impeller 400, which may be configured as a centrifugal fan, may include a central hub 408, a circular base 410, and the plurality of the air flow generating impeller blades 402. The hub 408 and blades 402 may be disposed upon a first, e.g., lower, side 418 of the base 410 as shown. The impeller may further include one or more shortened members 412 disposed upon the first side of the base 410, e.g., positioned between adjacent groupings of blades 402. The impeller 400 has an intended direction of rotation indicated by arrow 416.

The hub 408, which permits mounting of the impeller 400 to the output shaft 304 of the motor 300, may include an opening 409 that defines a rotational axis 438 of the impeller. The opening 409 may include one or more receiving surfaces, e.g., two opposite flat surfaces, to receive corresponding surfaces of the output shaft 304. In one embodiment, the hub 408 may protrude from the first side 418 of the base 402. The hub may form a face surface 413 offset from the base (e.g., from the first side 418), and an outer (e.g., generally cylindrical) surface 415 that both intersect at an outer hub edge 417.

The angular position of each blade 402 and each shortened member 412 may be characterized by a radial line extending from a center of the hub 408 to an outermost trailing edge of the respective blade. In this regard, one blade may be characterized as a reference blade at a zero (0) degree position, wherein an adjacent blade would be at a 40 degree position, a first shortened member 412 would be at an 80 degree position, etc. Accordingly, angular interval or offset may be defined as the difference between the angular positions of adjacent blades/shortened members.

The blades 402 may be disposed upon the first side 418 of the base 410 in three spaced groups of two blades each for a total of six blades. Each of the three groups of blades may be symmetrically spaced upon the base 410 about the rotational axis 438 of the impeller, e.g., the three groups of blades may be disposed at angular intervals of approximately 120 degrees.

As illustrated in FIGS. 13 and 14, each blade 402 may be curved outwardly away from the direction of rotation 416, e.g., each of the blades may be generally arc-shaped when viewed along (parallel to) the rotational axis 438 as generally illustrated in FIG. 14. The blades 402 are approximately identical in configuration and are, in general, radially disposed relative to the central hub 408. That is, each blade 402 may extend from the hub to a peripheral edge 411 of the base.

In one embodiment, a shortened member 412 is positioned between two or more of the groups of blades, e.g., there are three shortened member disposed at 120 degree increments. As described herein, the shortened members 412 may function as debris-engaging elements that act to break apart lawn debris into smaller portions during operation of the blower/vacuum when it is used in a vacuum configuration. As a result, the mulched lawn debris may be finer and occupy less volume in the vacuum collection bag 202 (see, e.g., FIG. 9).

Due to the presence of the shortened members 412, the angular interval between adjacent blades 402 may not be substantially uniform around the impeller 400 circumference, e.g., each blade 402 may have adjacent blades that are disposed at different angular intervals relative to the impeller center. In the illustrated embodiment, each of the blades 402 has a first neighboring blade displaced at an angular interval of about 40 degrees, and a second neighboring blade disposed at an angular interval of about 80 degrees. However, it should be appreciated that alternative angular intervals are also possible.

Each blade 402 may include an inner or first edge surface 420 adjacent the central hub 408. In one embodiment, each first edge surface 420 extends outwardly from the hub 408 and away from the first side 418 of the base 410. As shown in the figures, the first edge surface 420 may terminate at or near the face surface 413 of the hub 408. For example, the first edge surface 420 may extend outwardly from a first location that is at or near the outer hub edge 417, to a second location intermediate the hub 408 and the peripheral edge 411, wherein the second location is at an elevation below an elevation of the face surface 413 (e.g., when the blower/vacuum is positioned as shown in FIG. 11).

Each of the blades 402 may further include a second edge surface 422 extending inwardly from the peripheral edge 411 of the base 410 and away from the first side 418 of the base. For example, the second edge surface 422 may extend inwardly from the peripheral edge to a third location intermediate the hub 408 and the peripheral edge, wherein the third location is at substantially the same elevation as that of the second location.

Connecting the first edge surface 420 with the second edge surface 422 is an intermediate, third edge surface 424. The third edge surface 424 may, in one embodiment, be contained within a plane that is parallel to one or both of: the first side 418 of the base 410; and the face surface 413 of the hub 408. Each of the edge surfaces 420, 422, and 424 may be generally smooth as shown.

Like the blades 402, each member 412 may be curved or arc-shaped when viewed parallel to the rotational axis 438 of the impeller (e.g., as represented in FIG. 14). Each member 412 may include a relative smooth inside edge 426 (the edge adjacent the central hub 408) and a serrated or toothed outer edge 428. In one embodiment, serrations are formed on at least a portion of the outer edge 428 of each shortened member 412 by a plurality of serrations 430. While particular configurations are illustrated herein, other embodiments of the impeller may not include shortened members 412 (or may utilize shortened members lacking serrations) without departing from the scope of the invention.

An exemplary configuration of the impeller 400 will now be described primarily with reference to FIG. 14. Each blade 402, when viewed parallel to the rotational axis 438 of the impeller 400 (e.g., as shown in FIG. 14), may be defined by an inlet angle 432 and an outlet angle 434. The inlet angle 432 may, in general, correspond to an inlet or approach angle of the blade, while the outlet angle 434 may similarly correspond to an outlet or departure angle of the blade. In the illustrated embodiment, the inlet angle 432 may be determined by measuring the angle between: a first line 436 extending orthogonally from the rotational axis 438 of the impeller to a first point 440 located on the third edge surface 424 (e.g., located along a centerline of the impeller blade); and a second line 442 that is tangent to the impeller blade 402 (e.g., tangent to the centerline of the impeller blade) at the first point 440. The second line may, in one embodiment, be coplanar with the first line.

In the illustrated embodiment, the first point 440 is located along the blade at an elevation that is farthest from the face surface 418. For instance, the first point 440 may be located along the centerline of the blade 402 (e.g., along a curved line that bisects the blade) at an outermost portion of the third edge surface 424 (at or near the intersection with the second edge surface 422) as shown in FIGS. 13 and 14. This location of the first point 440 may define what is referred to herein as a transition diameter 442. The transition diameter 442 (as defined by the first point 440) may be selected to be generally equal in diameter to a cylindrical air entry portion of the air inlet cover 134 (see, e.g., FIG. 11). Stated alternatively, the impeller 400 may be configured such that the outermost portion of the third edge surface 424 is located proximate an inside (e.g., lower) edge 151 of the frusto-conical surface 128 of the air inlet cover 134 as shown in FIG. 11.

The inlet angle 432 may, in one embodiment, be about 26 degrees to about 34 degrees, and more preferably, about 28 degrees to about 32 degrees, e.g., about 30 degrees.

In addition to the inlet angle 432, each of the impeller blades 402, when viewed parallel to the rotational axis 438 of the impeller 400 (e.g., as shown in FIG. 14), may further define the outlet angle 434. The outlet angle 434 may be measured between: a third line 444 that extends orthogonally from the rotational axis 438 to a second point 446; and a fourth line 448 that is tangent to the impeller blade (e.g., tangent to the centerline of the impeller blade) at the second point 446. The second point 446 may be defined by the intersection of the impeller blade 402 (e.g., of the centerline of the impeller blade) with the peripheral edge 411 of the impeller.

The outlet angle 434 may, in one embodiment, be about 46 degrees to about 54 degrees, and more preferably, about 48 degrees to about 52 degrees, e.g., about 50 degrees.

In the illustrated embodiment, the second line 442 is coplanar with the first line 436, and the third line 444 is coplanar with the fourth line 448. However, in other embodiments, the pairs of lines could be offset, e.g., non-intersecting. In the case of the latter, those of skill in the art will realize that, for purposes of determining the inlet and outlet angles, each line could be projected onto a plane that is orthogonal to the rotational axis 438 to yield a common point of intersection. Similarly, those of skill in the art will realize that other intersections described herein (e.g., the intersection of the impeller blade 402 with the peripheral edge to define the second point 446) may be determined through similar projecting of the components to a common plane.

While not wishing to be bound to any particular configuration, the impeller 400 may, in one embodiment, be configured with a peripheral edge 411 defining a base having a diameter of about 4.5 inches to about 5 inches, e.g., about 4.7 inches. The transition diameter 442 (the diameter on which the first point 440 is located) may be about 2.7 inches to about 3.3 inches (e.g., about 3.03 inches), such that the first point is radially offset from the rotational axis of the impeller a distance of about 1.35 inches to about 1.65 inches. Moreover, each blade 402, as well as each shortened member 412, may, when viewed parallel to the rotational axis 438 of the impeller, be defined by an arc having a radius of about 1.3 inches to about 1.7 inches and, more preferably, about 1.5 inches to about 1.6 inches, e.g., about 1.56 inches.

The impeller 400 and/or portions thereof may be constructed from plastic (e.g., nylon) or, alternatively, a metal such as aluminum or magnesium to promote operational longevity.

Blower/vacs in accordance with embodiments of the present invention may provide several benefits. For instance, embodiments of the present invention may yield a blower/vacuum having the desired electrical current draw, i.e., having the maximum desired motor speed, with the blower tube installed while preventing excessive current draw should the blower tube be removed. Moreover, impellers constructed in accordance with embodiments of the present invention may provide a blower/vac with increased performance (e.g., greater air flow and reduced slip) for a given motor size and current load. Still further, blower/vacs in accordance with embodiments of the present invention may utilize a motor that minimizes air flow impediments through the motor, while decreasing accumulation of brush dust on motor components.

The complete disclosure of the patents, patent documents, and publications cited in the Background, the Detailed Description of Exemplary Embodiments, and elsewhere herein are incorporated by reference in their entirety as if each were individually incorporated.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A portable blower/vacuum comprising:
    a housing defining an air inlet and an air outlet;
    a blower tube to removably couple to the air outlet; and
    an air inlet cover to removably cover the air inlet, the air inlet cover comprising:
        a first attachment member attachable to the blower tube;
        a second attachment member attachable to the housing; and
        at least one retaining surface proximate the second attachment member, wherein the at least one retaining surface is configured to abut one or more outwardly facing stop surfaces formed on the housing and wherein the at least one retaining surface is located immediately outboard of the one or more outwardly facing stop surfaces, the at least one retaining surface comprising two parallel and spaced-apart vertical retaining surfaces each configured to contact one of the one or more outwardly facing stop surfaces of the housing.

2. The blower/vacuum of claim 1, wherein the at least one retaining surface is lateral to the second attachment member.

3. The blower/vacuum of claim 1, wherein the at least one retaining surface is contained within a plane.

4. The blower/vacuum of claim 1, wherein the first attachment member comprises a cylindrical member.

5. The blower/vacuum of claim 1, wherein the air inlet cover further comprises an interlock protrusion to extend into the housing.

6. The blower/vacuum of claim 1, wherein the blower tube further comprises a first attachment receiver to receive the first attachment member.

7. A portable blower/vacuum comprising:
    a housing defining an air inlet and an air outlet, wherein the housing comprises a first vacuum attachment receiver;
    a blower tube to removably couple to the air outlet; and
    an air inlet cover to removably cover the air inlet, the air inlet cover comprising:
        a first attachment member attachable to the blower tube, the blower tube comprising a first attachment receiver to receive the first attachment member, wherein the first attachment receiver of the blower tube nests within the first vacuum attachment receiver of the housing when the blower tube is coupled to the air outlet;
        a second attachment member attachable to the housing; and
        at least one retaining surface proximate the second attachment member, the at least one retaining surface configured to abut one or more stop surfaces formed on the housing.

8. The blower/vacuum of claim 7, wherein the housing further comprises a second attachment receiver to receive the second attachment member of the air inlet cover.

9. The blower/vacuum of claim 8, wherein the second attachment receiver comprises one or more flexible, resilient tabs configured to engage the second attachment member of the air inlet cover.

10. The blower/vacuum of claim 8, further comprising a vacuum tube assembly also operable to removably cover the air inlet of the housing in place of the air inlet cover, wherein the vacuum tube assembly comprises:

a first vacuum attachment member for attachment of the vacuum tube assembly to the first vacuum attachment receiver; and a second vacuum attachment member for attachment of the vacuum tube assembly to the second attachment receiver.

11. The blower/vacuum of claim 10, further comprising a collection bag attachable to the air outlet of the housing in place of the blower tube.

12. The blower/vacuum of claim 7, wherein the air inlet cover is bound by an aft surface that is flush with a proximal aft surface of the housing.

13. A portable blower/vacuum comprising:

a housing defining an air inlet and an air outlet, wherein the housing comprises a resilient flexible tab proximate a rear portion of the housing;

a blower tube to removably couple to the air outlet, the blower tube comprising a first attachment receiver; and an air inlet cover to removably cover the air inlet, the air inlet cover comprising:
 a transverse cylindrical member for connecting the air inlet cover to the first attachment receiver of the blower tube;
 a transverse lip for snap-fit coupling of the air inlet cover to the resilient flexible tab of the housing; and
 two spaced-apart retaining surfaces located at opposite ends of the transverse lip and facing one another, the spaced-apart retaining surfaces operable to bear against corresponding stop surfaces on an outer surface of the housing.

14. The blower/vacuum of claim 13, further comprising a vacuum tube assembly to removably cover the air inlet in place of the air inlet cover, wherein the vacuum tube assembly comprises: a first vacuum attachment member for connecting the vacuum tube assembly to a first vacuum attachment receiver located on a forward portion of the housing; and a second transverse lip for attachment of the vacuum tube assembly to the resilient flexible tab of the housing.

15. The blower/vacuum of claim 14, further comprising a collection bag attachable to the air outlet of the housing in place of the blower tube.

16. A portable blower/vacuum comprising:

a housing defining an air inlet and an air outlet, wherein the housing comprises: an attachment receiver; and vertical first and second stop surfaces on first and second laterally opposing sides of the housing, respectively;

a blower tube to removably couple to the air outlet; and an air inlet cover to attach to the housing and removably cover the air inlet, the air inlet cover comprising: an attachment member for coupling the air inlet cover to the attachment receiver of the housing; and vertical and spaced-apart first and second retaining surfaces located proximate the attachment member, wherein the first and second retaining surfaces are positionable in contact or close proximity to the first and second stop surfaces of the housing, respectively, when the air inlet cover is attached to the housing.

17. The blower/vacuum of claim 16, wherein the air inlet cover comprises an aft surface that is flush with an aft surface of the housing when the air inlet cover is attached to the housing to yield a smooth transition between the housing and the air inlet cover in the vicinity of the attachment receiver.

18. The blower/vacuum of claim 16, wherein the air inlet cover further comprises an interlock protrusion engageable with an interlock switch located within the housing when the air inlet cover is attached to the housing.

19. The blower/vacuum of claim 16, wherein the air inlet cover is contained within a plan envelope of the housing when the air inlet cover is attached to the housing.

20. The blower/vacuum of claim 16, further comprising a vacuum tube assembly to removably cover the air inlet in place of the air inlet cover, wherein the vacuum tube assembly comprises: a vacuum attachment member for receipt by the attachment receiver of the housing; and two parallel and spaced-apart retaining surfaces proximate an aft end of the vacuum tube assembly.

21. The blower/vacuum of claim 20, further comprising a collection bag attachable to the air outlet of the housing in place of the blower tube.

* * * * *